United States Patent
Maxeiner et al.

[11] 3,820,908
[45] June 28, 1974

[54] ELASTIC BALL-JOINT

[75] Inventors: Gottfried Maxeiner,
Dusseldorf-Kaiserswerth; Heinrich Muhr, Dusselford, both of Germany

[73] Assignee: A. Ehrenveich & Cie, Dusseldorf, Germany

[22] Filed: July 15, 1971

[21] Appl. No.: 162,770

[52] U.S. Cl. ............................ 403/133, 403/138
[51] Int. Cl. ................................. F16c 11/06
[58] Field of Search ........ 287/90 R, 90 C, 87, 85 A; 403/133, 136, 138

[56] References Cited
UNITED STATES PATENTS

| | | |
|---|---|---|
| 3,272,541 | 9/1966 | Latzen ............................ 287/90 C |
| 3,337,232 | 8/1967 | Peickii et al. .................... 287/85 R |
| 3,467,421 | 9/1969 | Bentley ............................ 287/85 R |
| 3,650,552 | 3/1972 | Schmid ............................ 287/90 R |

FOREIGN PATENTS OR APPLICATIONS

| | | |
|---|---|---|
| 840,176 | 7/1960 | Great Britain .................... 287/90 C |
| 338,658 | 7/1959 | Switzerland ...................... 287/90 R |
| 154,050 | 4/1956 | Sweden ............................ 287/90 R |
| 41,087 | 8/1932 | France ............................. 287/85 A |

Primary Examiner—Andrew V. Kundrat

[57] ABSTRACT

An elastic ball joint, in particular for steering rods of automatic vehicles, wherein the joint has different elasticities in both main load directions.

4 Claims, 6 Drawing Figures

PATENTED JUN 28 1974  3,820,908

INVENTORS

ELASTIC BALL-JOINT

The present invention relates to an elastic ball joint for automotive vehicles.

Elastic tie rod joints are used for many applications, because the jolts and noises arising from the wheels of the automotive vehicles and fed into the traveling gear parts are dampened, that means they are not at all or at least partly only transmitted to the body.

The elasticity of the bearings has, however, the characteristic, that the set steering angle varies elastically by the side forces effective upon the wheels. Since the side forces in a curve travel are smaller on the wheel at the inner curve than on the wheel at the outer curve, the steering angle variations are also different.

In order to compensate these differences between both elastic steering angle variations of the wheel on the inner curve and the wheel on the outer curve, it is one object of the present invention to provide an elastic ball joint in which each joint has different elasticities in both main load directions.

With this and other objects in view, which will become apparent in the following detailed description, the present invention, which is shown by example only, will be clearly understood, in connection with the accompanying drawing, in which FIG. 1 is a top plan view of a steering arrangement for a passenger car with the tie rods disposed behind the axis and shown schematically;

Figure 1:
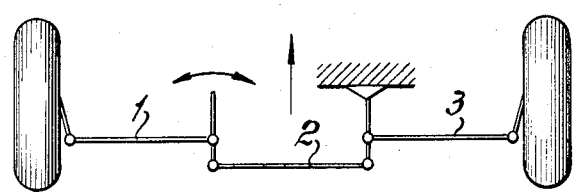

Referring now to the drawings and in particular to FIG. 1, in which a three-part tie rod 1, 2 and 3 is disposed behind the axis seen in the direction of travel. This means that in case of travel in a curve to the right, the left tie rod 1 is subjected to pressure, and the right tie rod 3 is subjected to pull, whereby the pressure forces from the left wheel are greater, than the pulling force from the right wheel disposed on the inner side of the curve. In case of a left curve, however, the right front wheel is stronger loaded as a wheel on the outer curve and, in particular, is subjected to pressure, while the front left wheel disposed at the inner side of the curve is subjected to pull, yet to a lesser degree.

If now, in accordance with the present invention, each joint has different elasticities in the main load directions, these elasticities are to be distributed such, that in the present instance the tie rods are designed in a manner, that the two joints on the sides pointing towards the tie rod, are harder than those at those sides which are remote from the tie rod.

Figure 2:
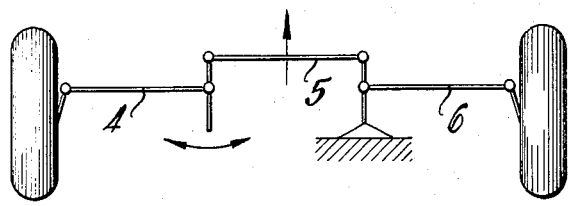
FIG. 2 is a schematical arrangement, similar to that in FIG. 1 however, wherein the tie pods are disposed in front of the axis.

Referring now to FIG. 2, a three part tie rod 4, 5 and 6 is disposed in the direction of travel in front of the axis. That means, that in a curve the left tie rod 4 is subjected to pull and the right tie rod 6 is subjected to pressure, whereby the pulling forces are greater on the left wheel disposed at the outer curve, than the pressure forces on the right wheel disposed on the inner curve. In case of a left curve, however, the right front wheel is stronger loaded than the wheel at the outer curve and in particular with pull, than the left front wheel, which is disposed on the inner curve, which is subjected to a lesser pressure load. In this case the pivot side pointing towards the tie rod must be designed softer, than the pivot sides remote from the tie rod.

Figure 3:
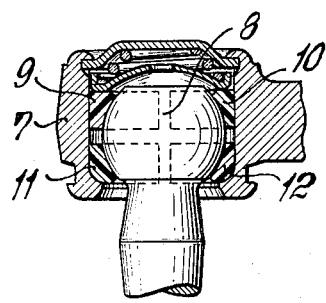
FIG. 3 is a section of a joint with coaxially divided bearings.
Figure 5:
FIG. 5 is a section through a bearing.
Figure 4:
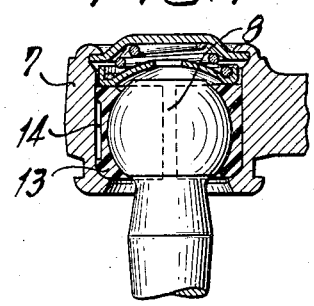
FIG. 4 is a section of another embodiment of the ball joint shown in FIG. 3.

Referring now again to the drawing and in particular to FIGS. 3 to 5, it is disclosed in what manner the different elasticities of the ball joints can be obtained in both main load directions.

In the joint shown in FIG. 3, a housing 7 surrounds a ball head 8 and an intermediate arrangement of the bearings 9, 10, 11 and 12 is provided.

The left halves 9 and 11 of the upper and the lower bearings are made of a working material of different elasticity than that applied for the right halves 10 and 12. It is to be understood, that the parts 9 and 11, as well as the parts 10 and 12, can be formed integrally of one piece.

Referring now again to the drawing, and in particular to FIG. 4, the different elasticity is brought about such that the bearings are constructed of the same working material, however, they are given a different configuration.

Thus, in the present instance the left bearing half 13 has recesses 14, in order to arrive at a predetermined form elasticity. Similar effects can be obtained, if one half of the bearing has a larger wall thickness, than the other half of the bearing.

Figure 5A:
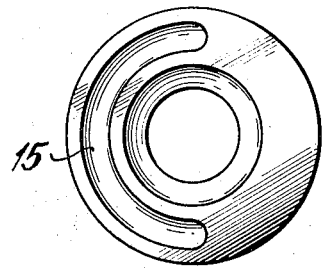
FIG. 5a is a top plan view of the bearing shown in FIG. 5.

Finally referring to FIGS. 5 and 5a, a form elasticity of one half of the bearing is obtained by appropriate recesses or by hollow spaces 15.

While we have disclosed several embodiments of the present invention, it is to be understood that these embodiments are given by example only, and not in a limiting sense.

We claim:

1. An elastic ball joint for steering rods of automotive vehicles, comprising
    a first rod including a socket housing portion, said first rod having a longitudinal axis,
    a second rod having a ball-head portion disposed in said socket housing,
    said socket housing and said ball-head cooperatively constituting a ball joint,
    two separate elastic means each having a different elasticity and disposed in said socket housing about said ball-head,
    said two elastic means each being disposed in a different position spaced along said longitudinal axis and on opposite sides of the longitudinal axis of said second rod, thereby providing different elasticities in a longitudinal and pulling and pushing, respectively, constituting a compression and tension, direction respectively, of said first rod.

2. The elastic ball joint, as set forth in claim 1, wherein
    said two means constitute two bearing means surrounding said ball head and divided in a plane disposed crosswise to said longitudinal axis and axially with respect to said ball head to form two halves, and
    said two halves are of materials having different elasticities.

3. The elastic ball joint, as set forth in claim 1, wherein said two means constitute two bearing means surrounding said ball head and divided in a plane disposed crosswise to said longitudinal axis and axially with respect to said ball head to form two halves, and said two halves of said bearing means have different configurations providing said different elasticities.

4. The elastic ball joint, as set forth in claim 1, wherein said two means constitute two bearing means surrounding said ball head and divided in a plane disposed crosswise to said longitudinal axis and axially with respect to said ball head to form two halves, and said two halves of said bearing means have different wall-thicknesses.

* * * * *

UNITED STATES PATENT OFFICE
CERTIFICATE OF CORRECTION

Patent No. 3,820,908          Dated June 28, 1974

Inventor(s) Gottfried Maxeiner et al.

It is certified that error appears in the above-identified patent and that said Letters Patent are hereby corrected as shown below:

On the cover sheet [73] "A. Ehrenveich & Cie" should read -- A. Ehrenreich & Cie --.

Signed and sealed this 1st day of October 1974.

(SEAL)
Attest:

McCOY M. GIBSON JR.
Attesting Officer

C. MARSHALL DANN
Commissioner of Patents